No. 715,093. Patented Dec. 2, 1902.
M. LANGMAN.
CLUTCH.
(Application filed Mar. 6, 1902.)
(No Model.)
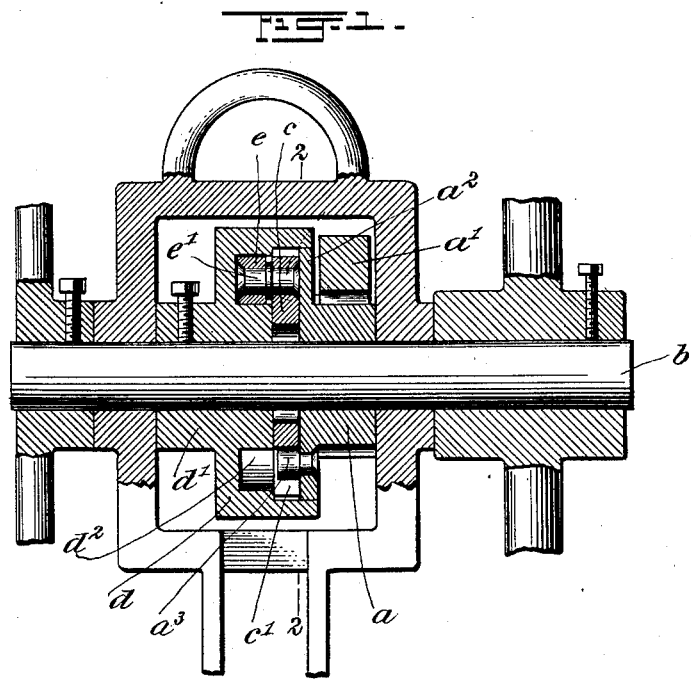
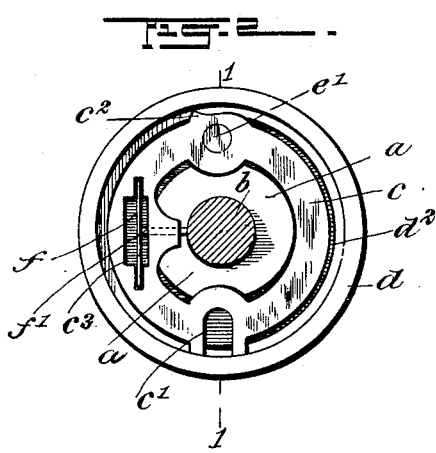
WITNESSES:
INVENTOR
Max Langman
BY
ATTORNEYS

UNITED STATES PATENT OFFICE.

MAX LANGMAN, OF NEW YORK, N. Y.

CLUTCH.

SPECIFICATION forming part of Letters Patent No. 715,093, dated December 2, 1902.

Application filed March 6, 1902. Serial No. 96,920. (No model.)

*To all whom it may concern:*

Be it known that I, MAX LANGMAN, a citizen of the United States, and a resident of the city of New York, borough of Manhattan, in the county and State of New York, have invented new and useful Improvements in Clutches, of which the following is a full, clear, and exact description.

This invention relates to a novel form of clutch for transmitting rotary movement from one part to another in one direction, the clutch permitting free rotation of the parts in the other direction.

This specification is a specific description of my invention, while the claims are definitions of its actual scope.

Figure 1 is a section on the line 1 1 of Fig. 2, and Fig. 2 is an elevation looking into the clutch and showing the shaft in section on the line 2 2 of Fig. 1.

$a$ indicates the driving member, here shown in the form of a pinion, and $a'$ indicates a rack or any other means for imparting alternate opposite rotations to the pinion or driving member $a$.

$b$ indicates the element to be driven, which element is here shown as a shaft, and the pinion $a$ being mounted loosely thereon. The pinion or driving member $a$ has a flange $a^2$, to which is fastened a pin $a^3$, this pin projecting laterally and engaging in a radial slot $c'$ in the clutch-ring $c$, which ring forms one of the clutch members. This clutch-ring $c$ is mounted in a case $d$, the hub $d'$ whereof is fastened to the shaft or driven member $b$. Formed in the case $d$ is an annular concentric groove $d^2$, and this groove loosely receives a roller $e$. The roller $e$ is mounted loosely on an arbor $e'$, fastened in the clutch-ring at a point opposite the slot $c'$, said arbor projecting inward from the ring properly to position the roller.

Formed on the clutch-ring at one side of the vertical center of the arbor $e'$, is a spur $c^2$, which projects from the periphery of the ring, and as the ring rocks to the left in Fig. 2 said spur engages the inner wall of the case $d$, thus fastening the ring to the case. The said wall of the case $d$ forms the second clutch member.

$c^3$ indicates a cavity in the ring $c$ in position approximately midway the pin $e'$ and slot $c'$, and in this cavity is placed a spring $f$, the spring being in the form of a leaf extending across the cavity.

$f'$ indicates a radially-disposed pin carried loosely in the ring and pressed by the spring $f$ against the shaft $b$, thus tending to throw the ring to the left in Fig. 2 and keeping the spur $c^2$ yieldingly engaged with the case $d$.

In the operation of the device the ring and its direct attachments turn with the driving member $a$, owing to the engagement of the pin $a^3$ in the slot $c'$. When the ring turns from right to left in Fig. 2, the ring, by the engagement of the pin $a^3$ therewith, rocks slightly around the center of the arbor $e'$, and the spur $c^2$ is thus disengaged from the case, and the shaft $b$ is idle. As the ring turns in the reverse direction it is rocked back around the center of the pin or arbor $e'$ by the action of the spur $c^2$. The ring is thus fastened to the case, and the member $b$ is driven from the member $a$. When the ring is loose and turning with the pinion, the roller $e$ being carried by the ring moves idly through the slot $d^2$. It will be observed that the roller $e$, with its arbor $e'$, forms a sort of pivotal support for the ring, around which pivot the ring is rocked to engage or disengage the spur $c^2$ with or from the case $d$, as above described.

The clutch is applicable to all sorts of machinery, as will be apparent to skilled mechanics, an example of its use being shown in my copending application for cloth-cutting machines, filed February 4, 1902, Serial No. 92,506.

Various changes in the form, proportions, and minor details of my invention may be resorted to at will without departing from the spirit and scope thereof. Hence I consider myself entitled to all such variations as may lie within the scope of my claims.

Having thus described my invention, I claim as new and desire to secure by Letters Patent—

1. In a clutch the combination with the driving and driven members of a case carried by the driven member, said case having an annular groove therein and forming one clutch member, a second clutch member, means for pivotally carrying the second clutch member, said means being mounted and freely movable in the groove of the case and sustained by the walls thereof, and the second clutch member having a spur at one side of the center of its pivot to engage the case, and means for connecting said second clutch member with the driving member.

2. In a clutch, the combination with the driving and driven members, of a case carried by the driven member, said case having an annular groove therein, a clutch-ring, means for pivotally carrying the clutch-ring, said means being mounted and freely movable in the groove of the case and sustained by the walls thereof and the clutch-ring having a spur at one side of the center of the pivot thereof, and means for connecting said ring with the driving member.

3. In a clutch, the combination with the driving and driven members, of a case carried by the driven member, said case having an annular groove therein, and forming one clutch member, a second clutch member, means for pivotally carrying the second clutch member, said means being mounted loosely and freely movable in the groove of the case and sustained by the walls thereof and the second clutch member having a spur at one side of the center of the pivot thereof and means for connecting said second clutch member with the driving member, the said means for pivotally mounting the second clutch member comprising a roller running in the groove in the case and a pin carried axially by the roller and having the second clutch member mounted thereon.

4. In a clutch, the combination with the driving and driven members of a case carried by the driving member, said case having an annular groove therein and forming one clutch member, a second clutch member, a pin whereby the same is pivotally mounted, a member carrying the pin, said member being mounted and freely movable in the groove in the case and sustained by the walls thereof, and the second clutch member having a spur at one side of the center of the pivot thereof, a disk attached to the driving member and a pin carried by the disk and having sliding connection with the second clutch member.

5. In a clutch, the combination with the driving and driven members, of a case carried by the driven member, said case having an annular groove in the face thereof, a roller mounted loosely and freely movable in said groove and sustained by the walls thereof, a clutch-ring located in the case and pivotally mounted on said roller, the clutch-ring having a spur at one side of the center of its pivot to engage the inner wall of the case, means carried by the ring for holding it yieldingly in active position, a disk lying against the case to close it, said disk being connected with the driving member, and a pin carried by the disk and engaging the clutch-ring.

6. In a clutch the combination of the rotary driven member, a case fastened thereto and having an annular groove opening into the interior of the case, a roller running loosely in the groove, a pin mounted in the roller, a clutch-ring connected with the pin to be pivotally mounted thereby, said ring being located in the case and having a spur arranged at one side of the pivot of the ring to engage the interior walls of the case for the purpose set forth, a rotary driving member and means for connecting the ring with the driving member.

7. In a clutch the combination of the rotary driven member, a case fastened thereto and having an annular groove opening into the interior of the case, a roller running loosely in the groove, a pin mounted in the roller, a clutch-ring connected with the pin to be pivotally mounted thereby, said ring being located in the case and having a spur arranged at one side of the pivot of the ring to engage the interior walls of the case for the purpose set forth, a rotary driving member and means for connecting the ring with the driving member, the said means for connecting the ring with the driving member comprising a disk arranged to turn with the driving member and lying alongside of the ring and a pin carried by the disk and engaged with the ring to impart thereto the movement of the disk.

8. In a clutch the combination of the rotary driven member, a case fastened thereto and having an annular groove opening into the interior of the case, said case also having an open side, a roller running loosely in the groove, a pin mounted in the roller, a clutch-ring connected with the pin to be pivotally mounted thereby, said ring being located in the case and having a spur arranged at one side of the pivot of the ring to engage the interior walls of the case for the purpose set forth, a rotary driving member and means for connecting the ring with the driving member, said means comprising a disk arranged to turn with the driving member and closing the open side of the case, and a part carried by the disk and engaged with the ring to drive the same.

In testimony whereof I have signed my name to this specification in the presence of two subscribing witnesses.

MAX LANGMAN.

Witnesses:
I. B. OWENS,
JNO. M. RITTER.